United States Patent
Matsumoto et al.

[11] Patent Number: 6,044,936
[45] Date of Patent: Apr. 4, 2000

[54] DISK BRAKE

[75] Inventors: Atsuo Matsumoto; Yoshiki Matsuzaki; Atsushi Kubo; Koji Mori; Shigeki Yoshimoto; Yousuke Igarashi; Katsuo Inoue, all of Itami, Japan

[73] Assignee: Sumitomo Electric Industries, Ltd., Osaka, Japan

[21] Appl. No.: 09/047,390

[22] Filed: Mar. 25, 1998

[30] Foreign Application Priority Data

Mar. 26, 1997 [JP] Japan .................................. 9-073267
Feb. 13, 1998 [JP] Japan .................................. 10-031453

[51] Int. Cl.[7] .................................................. F16D 55/18
[52] U.S. Cl. ........................................... 188/72.4; 277/177
[58] Field of Search ................................ 188/72.4, 71.8; 277/177

[56] References Cited

U.S. PATENT DOCUMENTS 5,826,681 10/1998 Kubo et al. ........................... 188/72.4

FOREIGN PATENT DOCUMENTS 0092896 11/1983 European Pat. Off. .
0762006 3/1997 European Pat. Off. .

*Primary Examiner*—Matthew C. Graham
*Attorney, Agent, or Firm*—Greenblum & Bernstein, P.L.C.

[57] ABSTRACT

An improved disk brake which provides both low dragging torque and good pedal feeling even on ABS-equipped vehicles with which the working fluid pressure is around or over 140 kgf/cm$^2$. The disk brake has a piston seal fitted in a groove formed in the cylinder. The piston seal is deformed when the brake piston is advanced by fluid pressure to press the pad and retracts the piston by its spring-back force when the fluid pressure is released. The width W of chamfer provided at edge of the seal groove is set to 1.0 mm or over and the hardness of the piston seal is set to 75° IRHD or over.

1 Claim, 7 Drawing Sheets

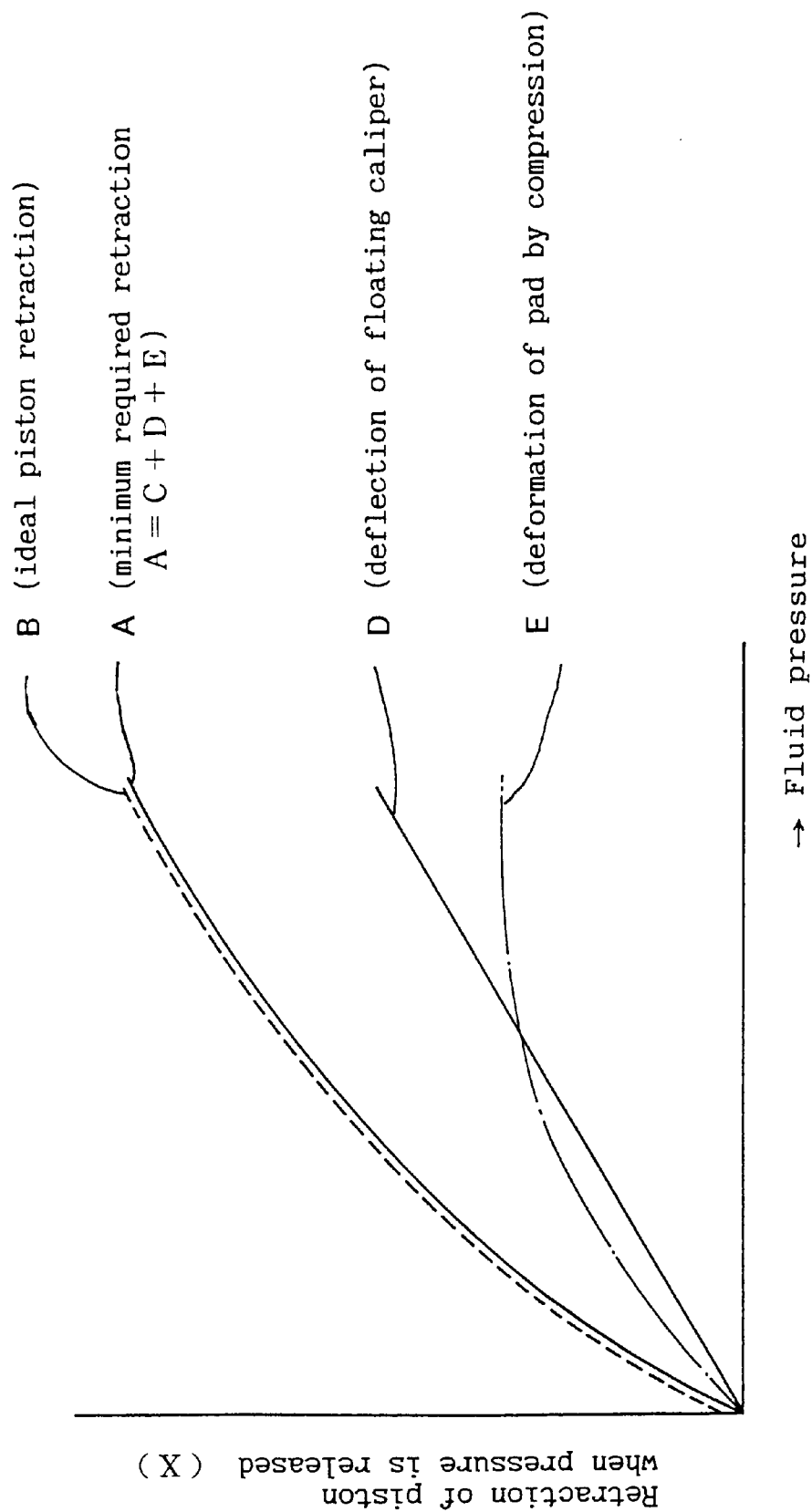

DISK BRAKE

BACKGROUND OF THE INVENTION

This invention relates to a disk brake having a piston retraction mechanism using a piston seal.

An ordinary hydraulic disk brake has a piston retraction means having a rubber ring called a piston seal. When the brake pressure is released, the piston seal as the retraction means retracts a brake piston (hereinafter simply "piston") by its elastic restoring force.

As shown in FIG. 1, a piston seal 1 of rubber is received in a seal groove 5 formed in the inner surface of a cylinder 3 defined in a caliper 2 and pressed against the outer periphery of the piston 4 inserted in the cylinder 3.

The edge of the groove 5 on the side remote from the fluid pressure receiving end of the piston (and near to the disk rotor) is chamfered (as shown at 6 in FIG. 1B and FIG. 3).

As the piston 4 is advanced, the piston seal 1 is resiliently deformed at its inner-diameter portion until the gap defined by the chamfer 6 is filled with the seal 11 as shown in FIG. 3B. When the fluid pressure is removed, the piston seal 1 springs back to its original shape, while retracting the piston 4 as shown in FIG. 3C.

This ensures a required clearance between a friction pad 7 (hereinafter simply "pad") and a disk rotor 8 (hereinafter simply "rotor").

If the piston 4 is advanced further from the position shown in FIG. 3B where the pad has deformed to the limit, slip occurs between the seal 1 and the piston 4, thus preventing further deformation of the piston seal 1 regardless of the degree of wear of the pad. This makes it possible to retract the piston under the same conditions at all times.

In the conventional arrangement for piston retraction, assuming that the upper limit of working fluid pressure for the disk brake (that is, the fluid pressure applied by treading a brake pedal when braking) is about 70 kgf/cm$^2$, the amount of chamfer (W in FIG. 3A) at the edge of the groove 5 is normally set to 0.5–0.8 mm.

However, for vehicles provided with an ABS (antilock brake system), the upper limit of the working fluid pressure is sometimes over 140 kgf/cm$^2$. In the range above the upper limit, the piston retraction amount may be insufficient, so that the pad may rub against the rotor (which is being rotated), causing what is called "dragging".

In order to prevent such a dragging, according to the conventional concept, it is necessary to increase the amount of chamfer W because the amount of piston retraction depends on the amount W of chamfer and the larger the amount W of chamfer, the larger the deformation of the piston seal and thus the larger the amount of piston retraction.

But this approach had a problem that although the piston retraction will be sufficient to prevent dragging when pressure is released from high pressure, the piston retraction will be excessive when pressure is released from low pressure, so that the fluid consumption increases, thus impairing pedal feeling.

The ideal performance required for the caliper is that the initial loss of fluid amount (which is consumed before the fluid pressure reaches to a predetermined level and which increases the play of brake pedal or ineffective stroke and impairs the pedal feeling) is minimized over a wide fluid pressure range and the dragging torque in a non-braking state is reduced to zero.

In order to meet these requirements, it is required that the relationship between the fluid pressure applied and the piston retraction amount X (when pressure is released) is as near as possible to the line B in the graph of FIG. 4.

The piston retraction amount X should be slightly larger than the minimum required retraction amount A which equals to clearance C (shown in FIG. 5) between the rotor and the pad+caliper deflection D+pad compression strain E and the difference between X and A should be as small as possible, (namely X=B>A and B≈A).

With the conventional piston retraction mechanism, the piston retraction at high pressure is insufficient while a sufficient piston retraction is obtained at low fluid pressure, and the piston retraction at low fluid pressure is excessive while a sufficient piston retraction is achieved at high pressure. In other words, as the upper limit of the working fluid pressure increases, it becomes difficult to achieve both good pedal feeling and low dragging torque.

An object of the present invention is to provide a disc brake which makes it possible to reduce the dragging torque while maintaining a good pedal feeling.

SUMMARY OF THE INVENTION

According to the present invention, there is provided a disk brake comprising a disk, a caliper formed with a cylinder, a brake piston mounted in the cylinder, a pad adapted to be pressed by the brake piston against the disk when a fluid pressure is applied to the piston, and a piston retracting means comprising a seal groove formed in the inner surface of the cylinder and provided with a chamfer along an edge thereof at a side remote from an end of the piston on which the fluid pressure acts, and a piston seal made of rubber and fitted in the seal groove so as to be pressed against the outer periphery of the piston to liquid-tightly seal the space between the cylinder and the brake piston, the piston seal being adapted to be pulled at its inner-diameter portion by the brake piston and resiliently deformed to fill a gap defined by the chamfer when the brake piston is advanced to press the pad against the disk, and to resiliently spring back to its original shape while retracting the piston when the fluid pressure is released, the chamfer baring a width W not less than 1.0 mm, the piston seal having a hardness of not less than 75° IRH.

The inclination angle of the chamfered portion (Θ in FIG. 3C) with respect to a plane perpendicular to the axis of the cylinder should be about 30° to 45°. The chamfer width W should not be over 1.5 mm because too large chamfer width requires increasing the thickness of the cylinder portion of the capliper.

Drivers of ABS-equipped cars are recommended to depress the brake pedal more strongly than when driving cars with no ABS's. Thus, when the ABS is on, a fluid pressure higher than 140 kgf/cm$^2$ will act on the brakes. Supposing that a fluid pressure of 140 kgf/cm$^2$ is applied, dragging problems are solvable if the maximum piston retracting distance is slightly greater than the minimum necessary piston retracting distance at this pressure (A in FIG. 4).

Considering the runout and thermal strain of the rotor, the deflection of the caliper, which increases in proportion to the fluid pressure, and the strain of the pads, a piston retracting distance of at least 0.6 mm is needed to reduce the dragging to zero when the fluid pressure is released from 140 kgf/cm$^2$, no matter how high the rigidity of the brake.

Some conventional brakes have a seal groove formed with a chamfer having a width of 0.8 mm. Even though the chamfer width is greater than the necessary piston retracting distance, i.e. 0.6 mm, dragging occurs when fluid pressure is released from high level. This is because the piston retracting distance is not equal to the chamfer width W but 60–70% of W.

From this fact, the present inventors found out that in order to reliably prevent such dragging when the pressure is released from high level such as 140 kgf/cm$^2$, the chamfer width W has to be 1.0 mm or over.

But if the chamfer width W is simply increased to 1.0 mm or over, the piston tends to retract excessively when a fluid pressure is released from low level, worsening the pedal feeling.

According to this invention, this problem is solved by adjusting the hardness of the piston seal.

The reason why the piston retracts excessively when pressure is released from a low pressure is presumably because when the seal is deformed, the moment arm length (distance from an axis about which the seal pivots to the seal inner periphery) tends to extend with the increase in chamfer width W, so that the seal is more likely to be deformed, and when the fluid pressure exceeds a certain point, seal deformation accompanied with slip of the piston seal on the piston under fluid pressure occurs. The degree of such deformation is greater than the distance the piston is pushed out. When the degree of deformation of the piston seal exceeds the distance the piston is pushed out, the piston will subsequently retract excessively when the fluid pressure is released and thus the pedal feeling becomes worse.

Once the pedal feelings deteriorates, the driver has to endure the bad pedal feelings until the relative position between the piston and piston seal (which has been disturbed due to excessive deformation of the seal) is corrected by a subsequent application of high fluid pressure to the brakes.

Piston seals used in conventional disk brakes have a hardness of less than 75° IRHD. No one in the art has ever associated the hardness of the piston seal with the chamfer width of the seal groove.

We, the inventors, are the first to find out the fact that even if the chamfer width W is large, comfortable pedal feeling can be maintained by using a piston seal having a hardness not less than 75° IRHD.

That is, while the maximum piston retracting distance is determined solely by the chamfer width W regardless of the hardness of piston seal (see FIGS. 6–8), the piston retracting distance when the fluid pressure is released before the piston seal is deformed to the limit is variable by changing the hardness of the piston seal and thus the amount of its deformation (relative to fluid pressure).

FIG. 9 shows the relationship between the rubber hardness of the piston seal and the piston retracting distance at pressure release when the chamfer width of the seal groove is 1 mm.

As seen from this graph, the fluid pressure at which the saturation deformation occurred was 73 kgf/cm$^2$ for a piston seal with a low rubber hardness A and 108 kgf/cm$^2$ for a piston seal with a high rubber hardness B. Also, the lower the piston seal hardness, the greater the difference between the piston retracting distance and the amount of deflection F of the caliper. For example, if the piston seal with a rubber hardness A is used, the piston retracting distance reaches its maximum value, which is determined by the chamfer width W, as early as at 73 kgf/cm$^2$ fluid pressure. In the region where the fluid pressure applied is low, the piston tends to retract excessively at pressure release (the nearer the fluid pressure applied is to the 140 kgf/cm$^2$ point, the smaller the degree of excess of the piston retracting distance).

In contrast, in the case of a piston seal having a rubber hardness of 75° IRHD, the piston retracting distance at pressure release is stable, i.e. substantially proportional to the fluid pressure, up to as high as the 140 kgf/cm$^2$ fluid pressure. Thus, according to the present invention, the hardness of the piston seal is set at 75° IRHD with the chamfer width W set at 1.0 mm or over.

As shown in FIGS. 8 and 9, when the hardness of the piston seal is increased with the chamfering amount W of the seal groove unchanged, the distance the piston retracts when the fluid pressure is released decreases in the range except the maximum piston retracting distance. Thus, by selecting a proper hardness for the seal, it is possible to stabilize the piston retracting distance at pressure release up to a high fluid pressure (140 kgf/cm$^2$) region.

Other features and objects of the present invention will become apparent from the following description made with reference to the accompanying drawings, in which:

BRIEF DESCRIPTION OF THE DRAWINGS

FIGS. 3A, 3B, 3C and 3D show how the piston retraction mechanism retracts the piston, in which FIGS. 3A–3D show the states where no fluid pressure is applied, fluid pressure is applied, fluid pressure is released, and a low fluid pressure is applied, respectively;

FIG. 4 is a graph showing the relationship between the distance by which the piston of a disk brake retracts when fluid pressure is released and the fluid pressure applied;

DETAILED DESCRIPTION OF THE PREFERRED EMBODIMENT

A disk brake embodying this invention is described with reference to FIGS. 1–3.

Figure 1A:
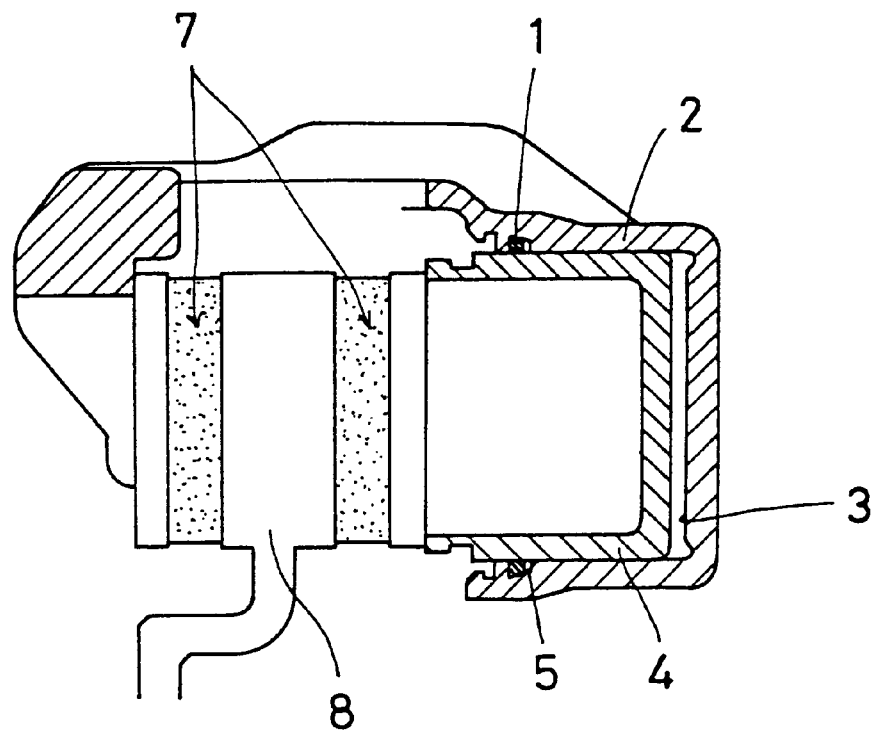
FIG. 1A is a sectional view of a floating type disk brake.
Figure 1B:
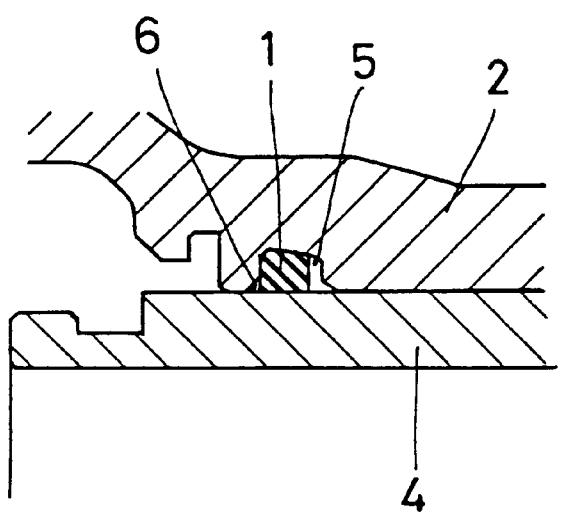
FIG. 1B is an enlarged view of a piston retraction mechanism of the brake of a type having opposed pistons.

FIG. 1 shows a floating type disk brake device. A piston 4 is received in a cylinder 3 formed in the inner side of the caliper 2. A seal groove 5 is formed in the inner periphery of the cylinder 3. A piston seal 1 fits in the groove 5 and engages the outer periphery of the piston 4 with an interference to liquid-tightly seal the space around the piston. FIG. 1A also shows pads 7 and a rotor 8 with which the pads are brought into frictional contact.

Figure 2:
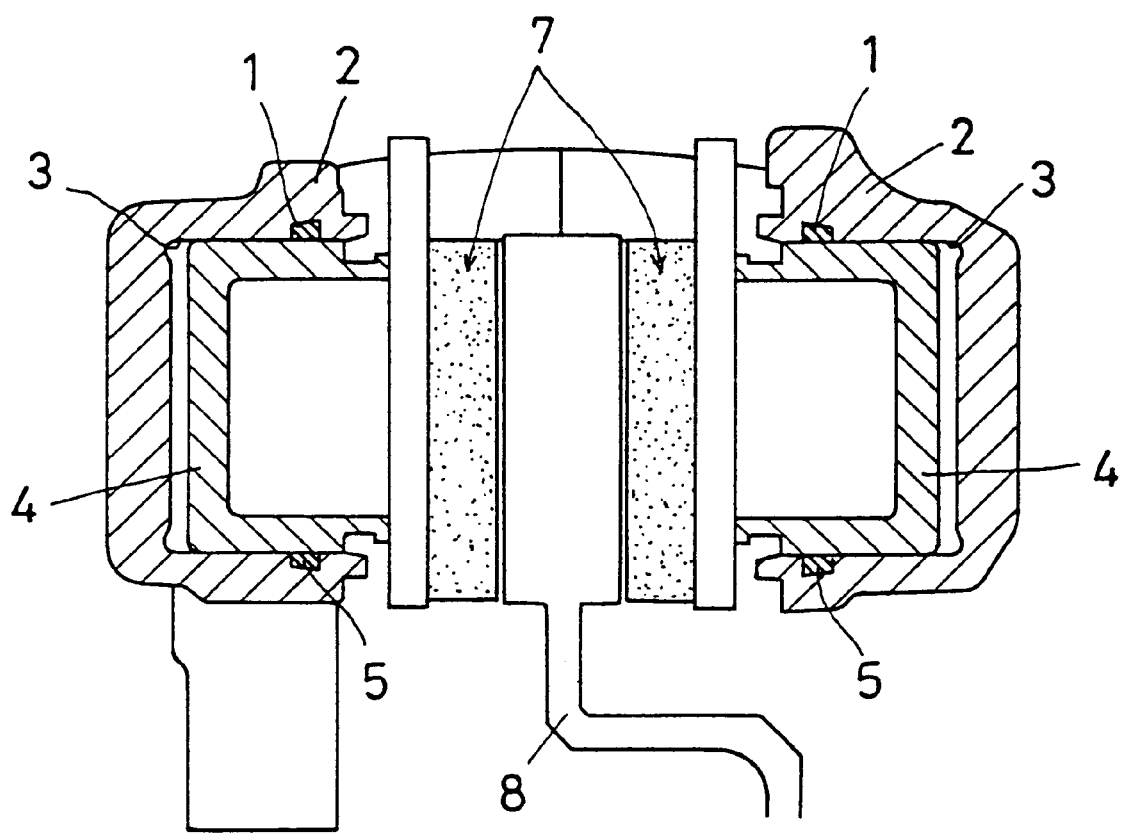
FIG. 2 is a sectional view of a disk brake device with opposed pistons.

FIG. 2 shows a disk brake having opposed pistons. Cylinders 3 are formed in the caliper 2. A piston 4 is received in each cylinder 3.

In the disk brakes of FIGS. 1 and 2, as well as conventional disk brakes having a piston retraction function, the seal groove 5 has a chamfer 6 (see FIG. 3) obliquely cutting one of the groove edges at a side remote from the piston end on which fluid pressure acts to permit deformation of the piston seal 1 to retract the piston 4. But the piston seal arrangement of the present invention differs from those of the conventional disk brakes in that the chamfering width W is 1.0 mm or more and that the piston seal has a hardness not less than 75° IRHD.

Figure 3A:
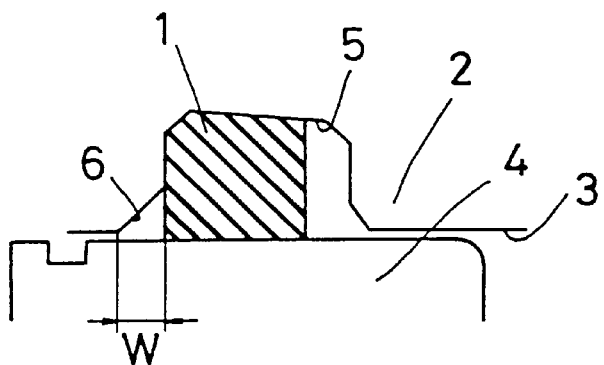
Figure 3B:
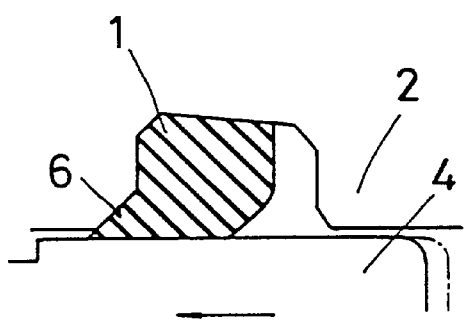
Figure 3C:
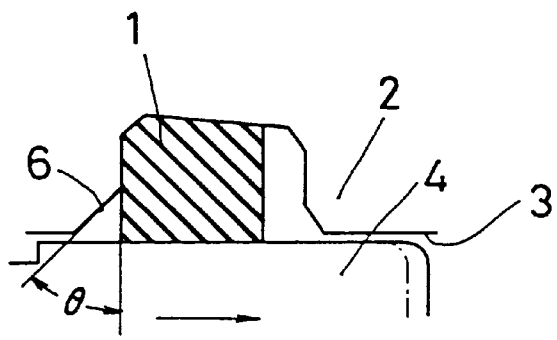
Figure 3D:
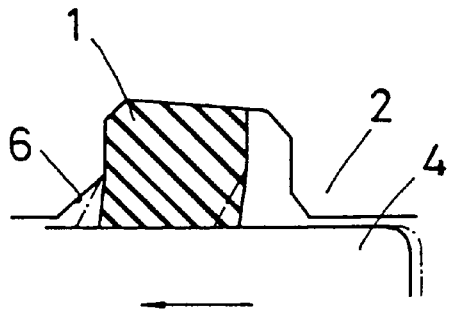
Figure 5:
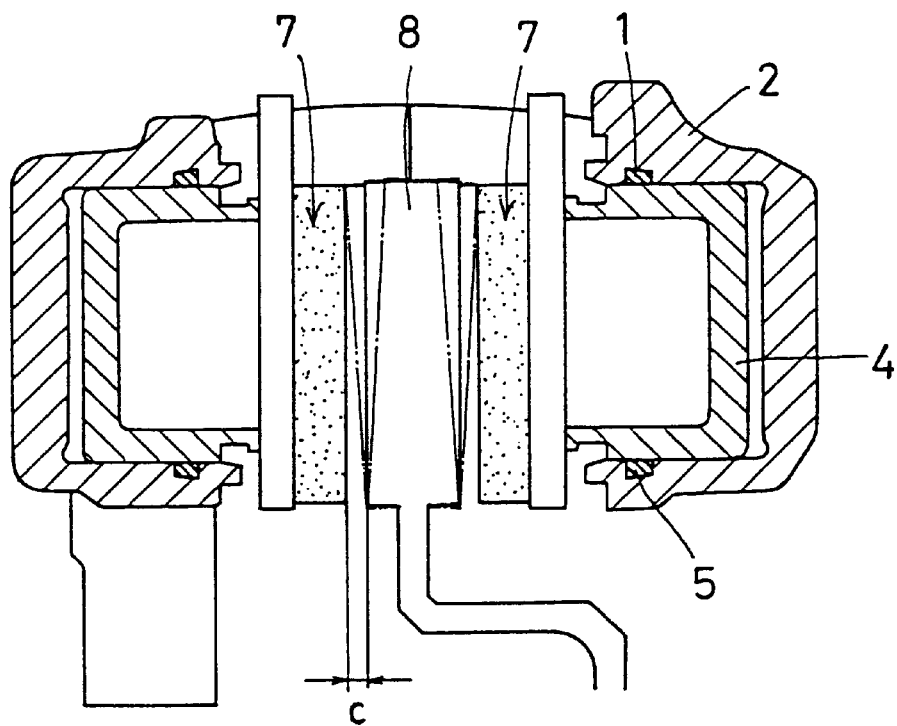
FIG. 5 shows how clearances are defined between the rotor and the pads while the brake is not applied.
Figure 6:
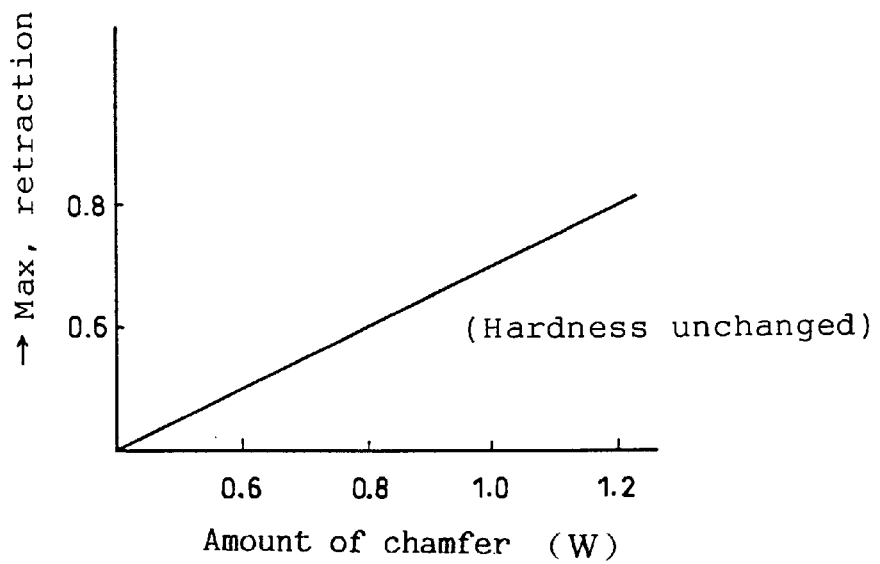
FIG. 6 is a graph showing the relationship between the width of a chamfer formed on the seal groove and the maximum piston retracting distance.
Figure 7:
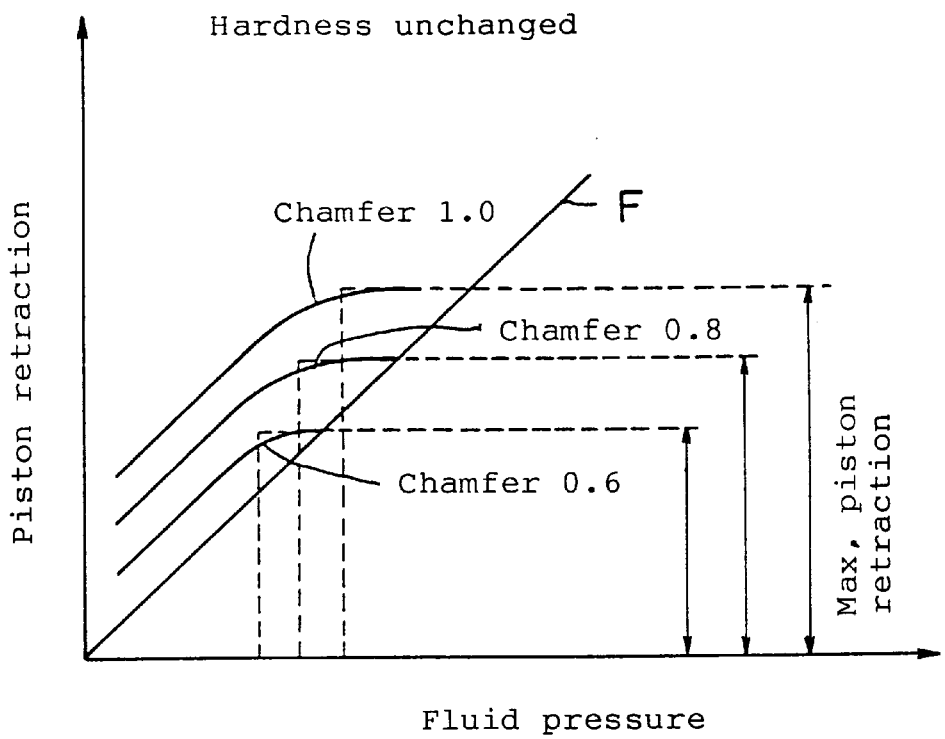
FIG. 7 is a graph showing the relationship between the piston retracting distance and the chamfer width when the hardness of the piston seal is constant.

FIG. 3D shows how the piston seal 1 is deformed under low fluid pressure. As shown, under the same fluid pressure, the amount of deformation of the piston seal is smaller when seal hardness is high (solid line) than when it is low (chain line). If the seal is deformed excessively due to insufficient rigidity of the seal, the piston will retract excessively, increasing the initial loss of fluid. Thus, a proper hardness of the piston seal has to be selected taking into consideration the chamfer amount W of the seal groove.

The chamfer amount W and seal hardness are not determinable to specific values because individual disk brakes vary in the amount of deflection of the caliper 2, compression strain of the pads 7 and the runout and thermal deformation of the rotor 8. But setting different chamfering amounts W for individual brakes is troublesome and thus not desirable for production control. A practical solution would be to set the same chamfer amount W for each group of similar disk brakes and make a fine adjustment for individual brakes in the same group by changing the hardness of the individual piston seals.

The amount of deflection D of the caliper, which is one of the determining factors of the distance the piston retracts when fluid pressure is released, depends on its shape, dimensions and elastic modulus. Among the automotive parts, disk brakes are by far the most important safety parts. Thus, the rigidity required for the calipers of individual disk brakes is practically not so much different from one another, and so is their amounts of deflection.

Also, considering the fact that the same brake performance is required for individual brakes, there is practically no difference in the amount of strain E in their pads.

Also, latest brake disk rotors have runout and thermal strain (C) values not so different among types (about 0.2 mm).

Thus, the piston retracting distance required at a given pressure differs little from one brake to another, and should be at least 0.6 mm.

The maximum piston retracting distance is about 60–70% of the width W of the chamfer formed in the seal groove. If this rate is 60%, the chamfer width D that permits a minimum necessary piston retracting distance of 0.6 mm will be 1.0 mm.

If the hardness of the piston seal 1 is 75° IRHD with the chamfer width W greater than 1.0 mm, the stabilizing region of the piston retracting distance will be under 140 kgf/cm$^2$. In such a case, in order to raise the stabilizing region above the 140 kgf/cm$^2$ level, a harder piston seal is used.

Figure 8:
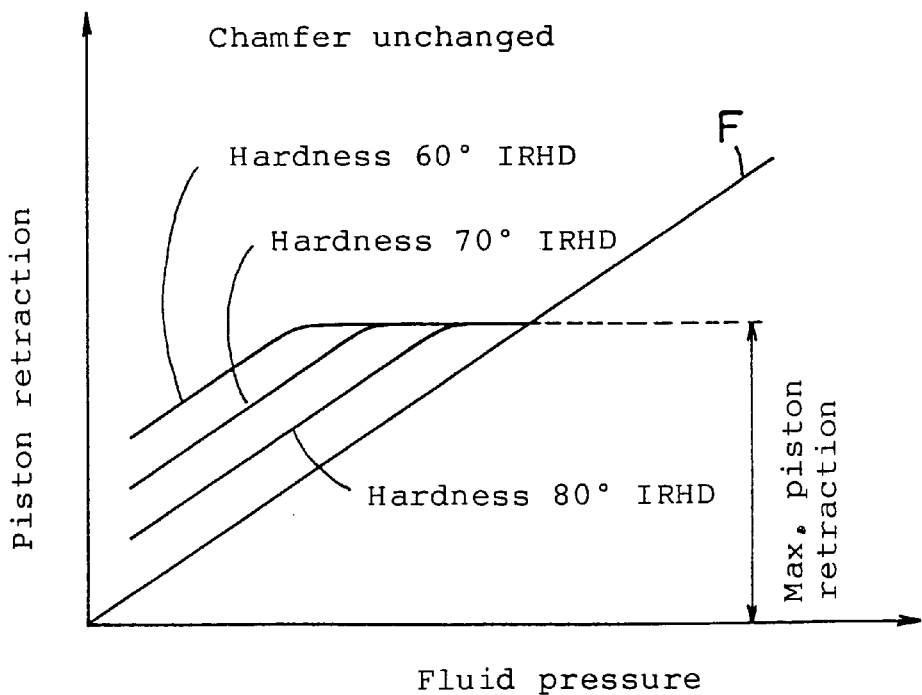
FIG. 8 is a graph showing the relationship between the piston retracting distance and the seal hardness when the chamfer width is constant.
Figure 9:
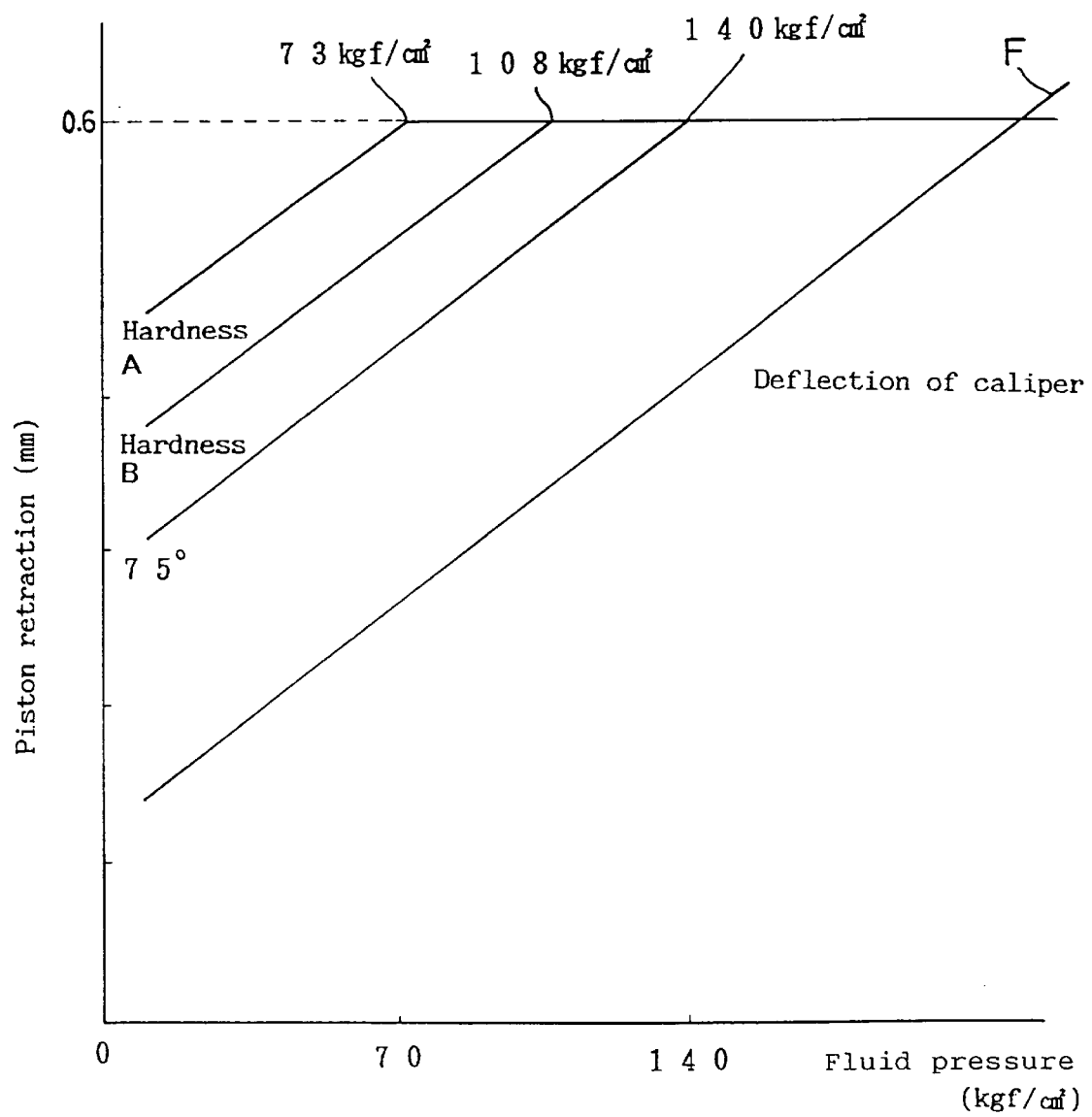
FIG. 9 is a graph showing the relationship between the piston retracting distance and the seal hardness when the chamfer width is constant at 1.0 mm.

In the case where the same seal chamfer width is used in different brakes, the width may be too large for some brakes. In such a case, the seal hardness may be adjusted. As already explained above, by increasing the seal hardness with the chamfer width W unchanged, the piston retracting distance at pressure release shortens as shown in FIGS. 8 and 9 (maximum retracting distance does not change). Thus, even if the actual chamfer width differs from the required chamfer width, it is possible to correct the piston retracting distance to an ideal value by adjusting the seal hardness.

A piston seal having a hardness of 90° IRHD or over is too hard to be called a rubber, and cannot possibly function as a seal. Considering also the ease of manufacture and assembly, the hardness of the piston seal should not exceed 85° IRHD.

The disk brake according to the invention has a seal groove formed with a chamfer having a width W of 1.0 mm or more. The hardness of the piston seal is adjusted to prevent increase in the initial fluid loss due to increased chamfer width W and to set the required piston retracting distance at pressure release for different types of brakes. Thus, it is possible to reduce the dragging torque and improve pedal feeling even with an ABS-equipped car, in which the drag starting fluid pressure can reach 140 kgf/cm$^2$.

What is claimed is:

1. A disk brake comprising a disk, a caliper formed with a cylinder, a brake piston mounted in said cylinder, a pad adapted to be pressed by said brake piston against said disk when a fluid pressure is applied to said piston, and a piston retractor comprising a seal groove formed in the inner surface of said cylinder and provided with a chamfer along an edge thereof at a side remote from an end of said piston on which said fluid pressure acts, and a piston seal made of rubber and fitted in said seal groove so as to be pressed against the outer periphery of said piston to liquid-tightly seal the space between said cylinder and said brake piston, said piston seal being adapted to be pulled at its inner-diameter portion by said brake piston and resiliently deformed to fill a gap defined by said chamfer when said brake piston is advanced by the fluid pressure to press said pad against said disk, and to resiliently spring back to its original shape while retracting said piston when the fluid pressure is released, said chamfer baring a width W not less than 1.0 mm, said piston seal having a hardness of not less than 75° IRHD.

* * * * *